(12) United States Patent
Linderyd et al.

(10) Patent No.: US 7,055,491 B2
(45) Date of Patent: Jun. 6, 2006

(54) PISTON-CYLINDER COMBINATION FOR A COMBUSTION ENGINE

(75) Inventors: Johan Linderyd, Sundbyberg (SE); Anders Larsson, Sodertalje (SE); Christer Mattsson, Norrtalje (SE)

(73) Assignee: Scania CV AB (publ) (SE)

( * ) Notice: Subject to any disclaimer, the term of this patent is extended or adjusted under 35 U.S.C. 154(b) by 0 days.

(21) Appl. No.: 10/502,677

(22) PCT Filed: Jan. 29, 2003

(86) PCT No.: PCT/SE03/00144

§ 371 (c)(1),
(2), (4) Date: Oct. 1, 2004

(87) PCT Pub. No.: WO03/064831

PCT Pub. Date: Aug. 7, 2003

(65) Prior Publication Data

US 2005/0178354 A1    Aug. 18, 2005

(30) Foreign Application Priority Data

Feb. 1, 2002    (SE) ................................. 0200288

(51) Int. Cl.
*F02F 3/26* (2006.01)
*F02F 3/16* (2006.01)

(52) U.S. Cl. ..................... 123/279; 123/256

(58) Field of Classification Search ............ 123/254, 123/279, 276, 274, 295, 305, 430
See application file for complete search history.

(56) References Cited

U.S. PATENT DOCUMENTS

| | | | | |
|---|---|---|---|---|
| 1,611,526 A | * | 12/1926 | Hesselman | 123/256 |
| 1,696,799 A | * | 12/1928 | Held | 123/256 |
| 2,132,805 A | | 10/1938 | Rosen | |
| 4,711,208 A | * | 12/1987 | Sander et al. | 123/271 |
| 5,950,593 A | * | 9/1999 | Matsuoka et al. | 123/292 |
| 6,371,061 B1 | * | 4/2002 | Lash | 123/41.35 |
| 6,536,404 B1 | * | 3/2003 | Liu et al. | 123/263 |
| 6,578,545 B1 | * | 6/2003 | Hultquist et al. | 123/299 |
| 6,644,268 B1 | * | 11/2003 | Konig et al. | 123/299 |
| 6,651,614 B1 | * | 11/2003 | Flamig-Vetter et al. | 123/301 |
| 6,705,273 B1 | * | 3/2004 | Liu et al. | 123/263 |
| 6,708,666 B1 | * | 3/2004 | Roberts, Jr. | 123/256 |
| 6,799,551 B1 | * | 10/2004 | Nakakita et al. | 123/295 |
| 2003/0217732 A1 | * | 11/2003 | Kataoka et al. | 123/276 |

FOREIGN PATENT DOCUMENTS

| | | |
|---|---|---|
| DE | 2 919 371 | 11/1980 |
| DE | 4 413 851 | 9/1994 |
| WO | WO 9 713 974 | 4/1997 |

OTHER PUBLICATIONS

International Search Report dated Mar. 17, 2003.

* cited by examiner

*Primary Examiner*—Mahmoud Gimie
(74) *Attorney, Agent, or Firm*—Ostrolenk, Faber, Gerb & Soffen, LLP

(57) ABSTRACT

A combustion engine with compression-initiated combustion comprises at least one cylinder in which a piston is movable axially between a lower dead center point and an upper dead center point, with a dead volume between the cylinder and the piston at the upper dead center point. The dead volume comprises at least two substantially separate spaces in the piston and/or the cylinder at the upper dead center point which are designed to ensure that combustion is initiated at different times.

19 Claims, 1 Drawing Sheet

PISTON-CYLINDER COMBINATION FOR A COMBUSTION ENGINE

FIELD OF THE INVENTION

The present invention relates to a combustion engine with compression-initiated combustion with a piston and cylinder cooperatingly shaped for achieving combustion at selected times.

STATE OF THE ART

Conventional diesel engines have an inherent problem of high $NO_x$ emissions due to high combustion temperatures which occur in limited portions of the combustion chamber because combustion takes place along a combustion front of limited extent.

In combustion engines of the HCCI type, this problem has been greatly alleviated by using a substantially homogeneous fuel/air mixture to cause substantially simultaneous combustion throughout the combustion chamber, resulting in substantially lower combustion temperatures locally and hence substantially reduced or even no $NO_x$ formation.

However, ideal HCCI combustion throughout the combustion chamber entails problems of severe mechanical stress on the various parts of the combustion engine and significant noise problems.

OBJECTS AND MOST IMPORTANT CHARACTERISTICS OF THE INVENTION

Accordingly, one object of the present invention is to provide a combustion engine which utilises the advantages of the HCCI engine. A particular object is to provide a combustion engine of the kind mentioned in the introduction in which the stress and noise problems are reduced.

These objects are achieved in a combustion engine of the kind mentioned in the introduction by providing the piston with dead volume comprising at least two separate spaces located at the upper center point of the piston in the cylinder for causing combustion to be initiated at different times.

Controlled lengthening of the period of combustion in the combustion chamber of the cylinder is thereby achieved, resulting in significant advantages in that the engine will no longer be subject to a stress peak of significant amplitude. The stress problems are thereby reduced and the noise problems will likewise be alleviated by the whole combustion taking place simultaneously.

Providing the piston crown with recesses corresponding to the separate spaces makes manufacture easier and reduces costs.

Differentiated cooling of wall portions belonging to the separate spaces is an effective way of controlling the initiation of combustion as desired so as to achieve desirable delay of combustion in certain parts of the combustion chamber.

Providing thermal insulation for at least some wall portions pertaining to some of the separate spaces achieves higher temperatures in corresponding separate spaces and earlier initiation of ignition in specifically said space(s), while walls to spaces without thermal insulation reach lower temperatures and therefore cool the corresponding space(s), thereby in principle causing later initiation of ignition.

Designing the separate spaces so that the volume/surface area ratio is varied results in corresponding control of the initiation of ignition, in which respect it may in general be stated that a high volume/surface area ratio causes earlier initiation of ignition than a low volume/surface area ratio in operating conditions which are otherwise alike.

Connection between the various separate spaces which are arranged for disparate initiation of ignition as above (insulation, cooling, volume/surface area ratio), via a small gap or narrow channel, may be arranged to provide a delaying effect due to the time which the combustion takes to spread via the gap or channel from the space in which combustion takes place first to the next space.

In addition, differentiated cooling may be applicable, usually in the form of increased cooling in the actual gap or channel. In this case, boundary layer effects also cause natural concentration differences as regards the fuel concentration in thin layers and more extensive regions respectively.

It is advantageous to position the separate spaces in such a way relative to fuel injectors, fuel mixture intakes, air intakes etc. that different fuel concentrations occur in the various separate spaces. This results in different times of initiation of ignition.

Further advantages are achieved by further aspects of the invention which are indicated by the following description of an embodiment.

BRIEF DESCRIPTION OF THE DRAWINGS

The invention will now be described in more detail on the basis of embodiments with reference to the attached drawings, in which.

DESCRIPTION OF EMBODIMENTS

Figure 1:
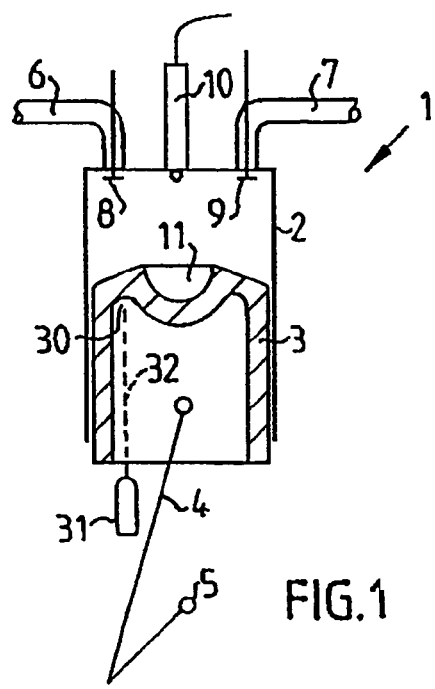
FIG. 1 depicts schematically a detail of a combustion engine according to the invention.

FIG. 1 depicts schematically a section through a cylinder belonging to a multi-cylinder combustion engine of the HCCI type intended, for example, to power a heavy vehicle, e.g. a truck or a bus. In an engine of the HCCI type, fuel ignition is initiated by compression in the same way as in a diesel engine except that the fuel is premixed with combustion air, preferably to a homogeneous mixture, before initiation of ignition in the same way as in an Otto engine. All of the engine's cylinders are of similar design, so the remainder of this description will cover only one of its cylinders, although the attached drawings depict various embodiments of cylinders and pistons.

FIG. 1 depicts a cylinder 2 which has a reciprocating movable piston 3 arranged in it in a conventional manner which is capable of moving axially between a lower dead centre point and an upper dead centre point and is connected to a crank arrangement incorporating a connecting rod 4 and a crankshaft 5 for transmitting driving power from the engine to an output shaft.

An inlet duct 6 for supply of air and an exhaust duct 7 for removal of exhaust gases are connected to the cylinder 2, and these ducts have at least one inlet valve 8 and one exhaust valve 9 respectively arranged in them. The cylinder 2 also has a nozzle discharging into it which belongs to a fuel injector 10 which is oriented for injecting fuel directly info the cylinder 2 in the region of a piston crown hollow 11 in the piston 3. The fuel injector 10 is conventionally fitted in a cylinder head which delineates the cylinder 2 upwards.

A homogeneous mixture of fuel and air injected for combustion may be achieved in a number of different ways, e.g. by injecting fuel directly into the cylinder 2, preferably relatively early in the cylinder's compression phase, by means of the depicted fuel injector 10.

The piston 3 is cooled in a conventional manner by oil by means of an arrangement incorporating a nozzle 31 which sprays cooling oil towards an internal space 30 inside the piston, e.g. along a wall which is illustrated by a broken line 32.

Figure 2:
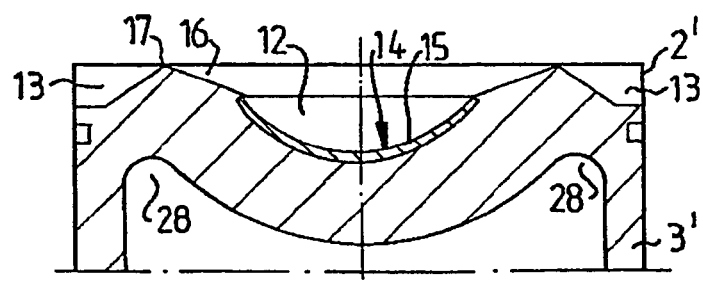
FIG. 2 depicts on a larger scale a section through part of a piston crown for a combustion engine according to the invention.

FIG. 2 depicts in section a piston crown belonging to a piston 3'. When the piston 3' is at its upper dead centre point inside the cylinder 2', an enclosed dead volume is formed between the piston 3' and the walls of the cylinder 2' (i.e. the cylinder's cylindrical walls and the cylinder's cylinder head). The piston crown is provided with two separate spaces, one of these being a first separate space 12 which is provided with a bowl-shaped lower delineating surface 14. This surface 14 is provided with thermal insulation 15 to prevent heat being conducted away from this region.

The first separate space 12 also comprises a transition region 16 which is delineated by a planar conical surface on the piston crown. The result is a tapering in the axial direction as viewed radially outwards to an annular edge portion 17 which constitutes a radial inner boundary of an annular volume which constitutes a second separate space 13 which is thus situated peripherally relative to (radially outside) the first separate space 12.

Within the region of the edge portion 17, which is preferably gently rounded, there is a narrow gap between the piston and the cylinder head situated above it when the piston 3' is at its upper dead centre position. The gap is designed in such a way that combustion initiated in the first separate space 12 spreads with limited velocity to the second separate space 13. The result will be delayed initiation of ignition in the second separate space 13 and hence, in total, a lengthened period of combustion of the fuel/air mixture totally enclosed in the cylinder. In addition, each of the separate spaces has a respective volume and is delimited by a respective delineating surface and there is a ratio between the volume and the delineating surface of the respective separate spaces that is selected to cause control initiation of combustion.

The underside of the piston crown has a recess 28 arranged in it to receive cooling oil in the same way as described with reference to FIG. 1, thereby causing cooling of the surface region peripherally on the top of the piston. This means that the second separate space has a lower temperature than that in the central part of the piston's first separate space 12. In addition, the thermal insulation 15 in the bottom of the first separate space 12 helps to increase the temperature difference between the two separate spaces.

The overall results of this design will be, firstly, delayed initiation of combustion radially outwards in the transition region 16 due to the taper in the first space 12, and, secondly, further delayed initiation of combustion in the second separate space 13 due to the gap at the edge 17 and the cooling by the oil sprayed into the recess 28. The combustion initiated by the compression will thus take place at different times in the two spaces.

The general design of the separate second space 13 may be such that initiation of combustion only takes place some degrees after the piston's upper dead centre point, i.e. when the piston has moved downwards as viewed in FIG. 2.

Figure 3:
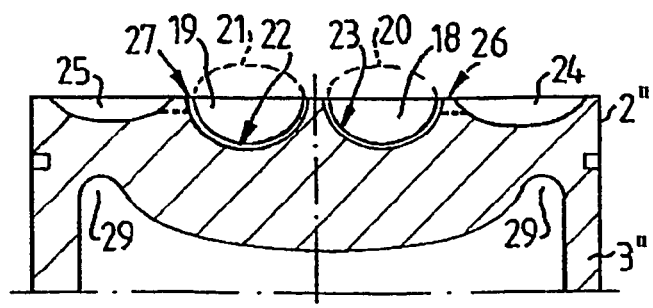
FIG. 3 depicts in a manner corresponding to FIG. 2 another version of a piston crown for a combustion engine according to the invention.

FIG. 3 depicts a piston 3" of somewhat different design which is inserted in a cylinder 2". In this case there are two centrally situated first separate spaces 18 and 19 which are provided with bowl-shaped lower delineating surfaces 22 and 23 respectively. The latter are thermally insulated in a manner corresponding to that shown in FIG. 2. In this case there may possibly be corresponding recesses in a cylinder head belonging to the cylinder 2", as illustrated by broken lines and designated 20 and 21 respectively to form more spherically shaped volumes of the combustion space.

In addition, the crown of the piston 3" exhibits a number of second separate spaces, two of which are depicted and are denoted by refs. 24 and 25. When the piston is at its upper dead centre position, these second separate spaces may be in communication with the first separate spaces via narrow gaps in the regions 26 and 27 respectively in a manner corresponding to that described with reference to FIG. 2. Alternatively, communication may also be arranged by grooves being provided in the piston crown in this region to form channels between the first separate spaces and the second separate spaces. Such channels are illustrated by broken lines in the regions 26 and 27. Cooling of the second separate space may be arranged, analogously with what is described above, by oil spray into a space 29 on the underside of the piston. There may at the same time also be cooling of the regions 26, 27 of the piston which form gaps or incorporate the channels 26, 27 in the piston.

A multiplicity of second separate spaces may be distributed about the two first separate spaces 18 and 19 at different distances from these latter so that varied delay of ignition can be provided for these various second separate spaces.

The invention may be modified within the scopes of the attached claims and specialists will appreciate that pistons for combustion engines according to the invention may be designed in different ways to ensure that the initiation of combustion takes place at different times. The cylinder head may of course also be designed correspondingly. A further factor which affects the combustion is the ratio between the volume and surface area of the respective spaces, and the initiation of combustion may be controlled by suitable adjustment of this ratio.

The combustion engine according to the invention is intended for homogeneous combustion, and the establishment of a homogeneous fuel mixture in the combustion chamber may be achieved as indicated with reference to FIG. 1. However, it may also be achieved, for example, by introducing a premixed fuel/air mixture via the combustion engine's inlet ducts by means of an injector (not depicted) arranged in the inlet duct 6, for mixing of fuel with air in the inlet duct 6 before the resulting homogeneous fuel/air mixture is introduced into the cylinder 2. It is also possible to combine these various versions. It is nevertheless not necessary that the fuel concentration be homogeneous throughout the dead space, as alternative embodiments may have the separate spaces so situated as to achieve differences as regards fuel concentration.

The invention does not exclude the possibility that the engine according to the invention might incorporate means for EGR feedback.

The fuels preferred in connection with the invention are normal fuels such as diesel fuel or some other suitable liquid or gaseous motor fuel, e.g. gasoline, ethanol, natural gas or methanol.

The invention claimed is:

1. A piston-cylinder combination for a combustion engine , the combination comprising at least one cylinder, a piston movable axially in the at least one cylinder between a lower dead center point and an upper dead center point, the cylinder and the piston being configured for compression-initiated combustion, a dead volume between the cylinder and the piston at the upper dead center point, the dead volume comprising at least two substantially separate spaces between the piston and the cylinder and which are designed to cause combustion in the cylinder to be initiated at different times.

2. A piston-cylinder combination for a combustion engine according to claim 1, wherein the piston has a crown which has recesses corresponding to and defining the separate spaces.

3. A piston-cylinder combination for a combustion engine according to claim 2, wherein the cylinder has recesses corresponding to and defining the separate spaces.

4. A piston-cylinder combination for a combustion engine according to the claim 1, wherein the piston includes wall portions surrounding the separate spaces, and devices to cool the wall portions differentially.

5. A piston-cylinder combination for a combustion engine according to claim 1, further comprising thermal insulation at least at one of the separate spaces.

6. A piston-cylinder combination for a combustion engine according to claim 1, wherein the respective separate spaces define a ratio between the volume and a delineating surface of the spaces which is selected to result in controlled initiation of combustion.

7. A piston-cylinder combination for a combustion engine according to claim 1, wherein the separate spaces are situated to achieve different fuel concentration in different ones of the spaces.

8. A piston-cylinder combination for a combustion engine according to claim 1, wherein the engine is an HCCI engine.

9. A piston-cylinder combination for a combustion engine according to claim 1, further comprising a device for supplying a fuel/air mixture to the cylinder.

10. A piston-cylinder combination for a combustion engine according to claim 1, further comprising a device for direct fuel injection into the cylinder.

11. A piston-cylinder combination for a combustion engine according to claim 1, wherein the cylinder has recesses corresponding to and defining the separate spaces.

12. A piston-cylinder combination for a combustion engine with compression-initiated combustion, the combination comprising at least one cylinder, a piston movable axially in the at least one cylinder between a lower dead center point and an upper dead center point, with a dead volume between the cylinder and the piston at the upper dead center point, the dead volume comprising at least two substantially separate spaces between the piston and the cylinder and which are designed to cause combustion in the cylinder to be initiated at different times, and at least one small gap or narrow channel connecting the separate spaces at the position of the piston's upper dead center point.

13. A piston-cylinder combination for a combustion engine according to claim 12, wherein at least one of the spaces is centrally situated in the cylinder and at least one of the spaces is peripherally situated and a portion which tapers radially outwards in the axial direction leading from the centrally situated space to the peripherally situated space.

14. A piston-cylinder combination for a combustion engine according to claim 12, further comprising a delineating surface for the gap or the channel and which is cooled.

15. A piston-cylinder combination for a combustion engine according to claim 12, wherein the second one of the spaces is annular and extends around the first one of the spaces.

16. A piston-cylinder combination for a combustion engine according to claim 15, further comprising the first one of the separate spaces being more thermally insulated than the second one of the spaces.

17. A piston-cylinder combination for a combustion engine according to claim 15, wherein the piston has a crown which has recesses corresponding to the separate spaces.

18. A piston-cylinder combination for a combustion engine with compression-initiated combustion, the combination comprising at least one cylinder, a piston movable axially in the at least one cylinder between a lower dead center point and an upper dead center point, with a dead volume between the cylinder and the piston at the upper dead center point, the dead volume comprising at least two substantially separate spaces between the piston and the cylinder and which are designed to cause combustion in the cylinder to be initiated at different times, wherein the piston has a crown which has recesses corresponding to and defining the separate spaces, and at least one small gap or narrow channel in the crown of the piston and connecting the separate spaces at the position of the piston's upper dead center point.

19. A piston-cylinder combination for a combustion engine according to claim 18, wherein at least one of the spaces is centrally situated in the cylinder and at least one of the spaces is peripherally situated and a portion which tapers radially outwards in the axial direction leading from the centrally situated space to the peripherally situated space.

* * * * *